US012186603B2

(12) United States Patent
Chan

(10) Patent No.: US 12,186,603 B2
(45) Date of Patent: Jan. 7, 2025

(54) WATERPROOF DRIVING SHAFT FOR A VENTILATION APPARATUS

(71) Applicant: Ya-Ching Chan, Taichung (TW)

(72) Inventor: Ya-Ching Chan, Taichung (TW)

( * ) Notice: Subject to any disclaimer, the term of this patent is extended or adjusted under 35 U.S.C. 154(b) by 396 days.

(21) Appl. No.: 17/661,766

(22) Filed: May 3, 2022

(65) Prior Publication Data

US 2023/0356013 A1 Nov. 9, 2023

(51) Int. Cl.
*A62C 2/24* (2006.01)

(52) U.S. Cl.
CPC .................................... *A62C 2/24* (2013.01)

(58) Field of Classification Search
CPC .......... A62C 2/24; E05C 17/30; E05F 15/611; E05F 15/71; F16B 7/10; E04H 12/182
See application file for complete search history.

(56) References Cited

U.S. PATENT DOCUMENTS

2010/0024161 A1* 2/2010 Wood ...................... E05C 17/30 16/82

FOREIGN PATENT DOCUMENTS

| | | | | |
|---|---|---|---|---|
| CN | 113374762 A | * | 9/2021 |
| TW | I691684 B | * | 4/2020 |

OTHER PUBLICATIONS

English translation of TWI691684B, dated Jul. 25, 2024 (Year: 2024).*
English translation of CN-113374762-A, dated Jul. 25, 2024 (Year: 2024).*

* cited by examiner

*Primary Examiner* — Edelmira Bosques
*Assistant Examiner* — Brett Peterson Mallon
(74) *Attorney, Agent, or Firm* — Rosenberg, Klein & Lee

(57) ABSTRACT

A waterproof driving shaft includes an inner tubular member defining an accommodation space and extending along an axis, an electrical driving unit disposed in the accommodation space to actuate a movement of a moving shaft member along the axis relative to the inner tubular member. A shield unit is securely connected with the moving shaft member and seals the accommodation space to prevent moisture and humidity from entering the inner tubular member so as to prolong the service life of the driving unit.

7 Claims, 6 Drawing Sheets

WATERPROOF DRIVING SHAFT FOR A VENTILATION APPARATUS

FIELD

The disclosure relates to an electrical driving shaft, and more particularly to a waterproof driving shaft for a ventilation apparatus.

BACKGROUND

A conventional fire ventilation apparatus as disclosed in TWI 691684 is adapted to be mounted to a building for mechanically and electrically opening an exhaust port of the building in case of fire emergency. The fire ventilation apparatus includes a cover plate movably covering the exhaust port, and first and second actuating units connected between the cover plate and the building. The first actuating unit mechanically drives the cover plate to a shielding state and to a ventilating state. The second actuating unit has a telescopic rod which is electrically operated to move the cover plate between the shielding state and the ventilating state. The telescopic rod is connected with the cover plate and the building by means of a first connecting piece and a second connecting piece, respectively. One or both of the first and second connecting pieces is (are) made of an alloy with a low melting point. When the temperature in the building reaches the melting point of the alloy to cause melting, any one of the first and second connecting pieces may be separated from the cover plate or the building so that the cover plate returns to the ventilating state by virtue of a mechanical restoring force of the first actuating unit.

However, moisture and humidity may enter the second actuating unit from the opened cover plate to cause an electrical short circuit or a motor controller of the second actuating unit to break and lead to malfunction of the fire ventilation apparatus.

SUMMARY

Therefore, an object of the disclosure is to provide a waterproof driving shaft for a fire ventilation apparatus that can alleviate at least one of the drawbacks of the prior art.

According to the disclosure, the waterproof driving shaft includes an inner tubular member, an electrical driving unit, a moving shaft member and a shield unit. The inner tubular member has a tubular wall which defines an accommodation space therein and extends along an axis, a through hole which is formed at an end thereof and in communication with the accommodation space, and at least one first guiding portion which is formed on and extends radially from the tubular wall. The electrical driving unit is disposed in the accommodation space of the tubular wall. The moving shaft member slidably extends through the through hole and along the axis. The moving shaft member has an inner end portion inserted into the accommodation space, and an outer end portion extending outwardly of the inner tubular member. The inner end portion is actuated by the electrical driving unit to move the outer end portion relative to the inner tubular member along the axis. The shield unit is securely connected with the moving shaft member. The shield unit includes a surrounding wall which surrounds the tubular wall and extends along the axis to terminate at a wall end that surrounds the outer end portion, and an end cap which is securely connected with the wall end and the moving shaft member and adjacent to the outer end portion. The shield unit cooperates with the tubular wall to seal the accommodation space. The shield unit further includes at least one second guiding portion which is formed on and extends radially from the surrounding wall and which is slidably engaged with the first guiding portion to be slidable relative to the first guiding portion along the axis.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
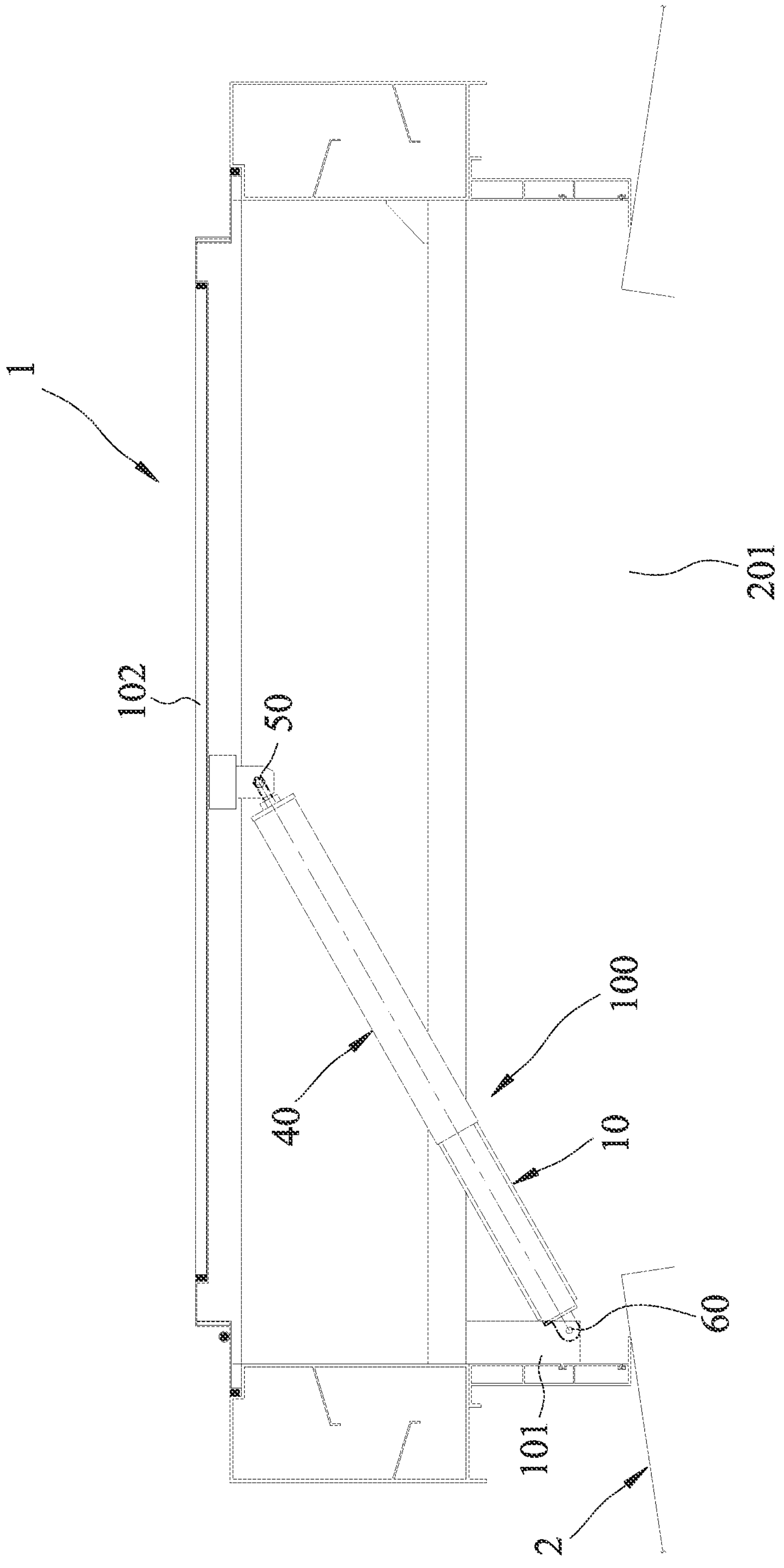
FIG. 1 is a schematic view illustrating an embodiment of a waterproof driving shaft according to the disclosure mounted on a fire ventilation apparatus in a state when a cover plate of the fire ventilation apparatus is in a shielding state relative to a frame.
Figure 2:
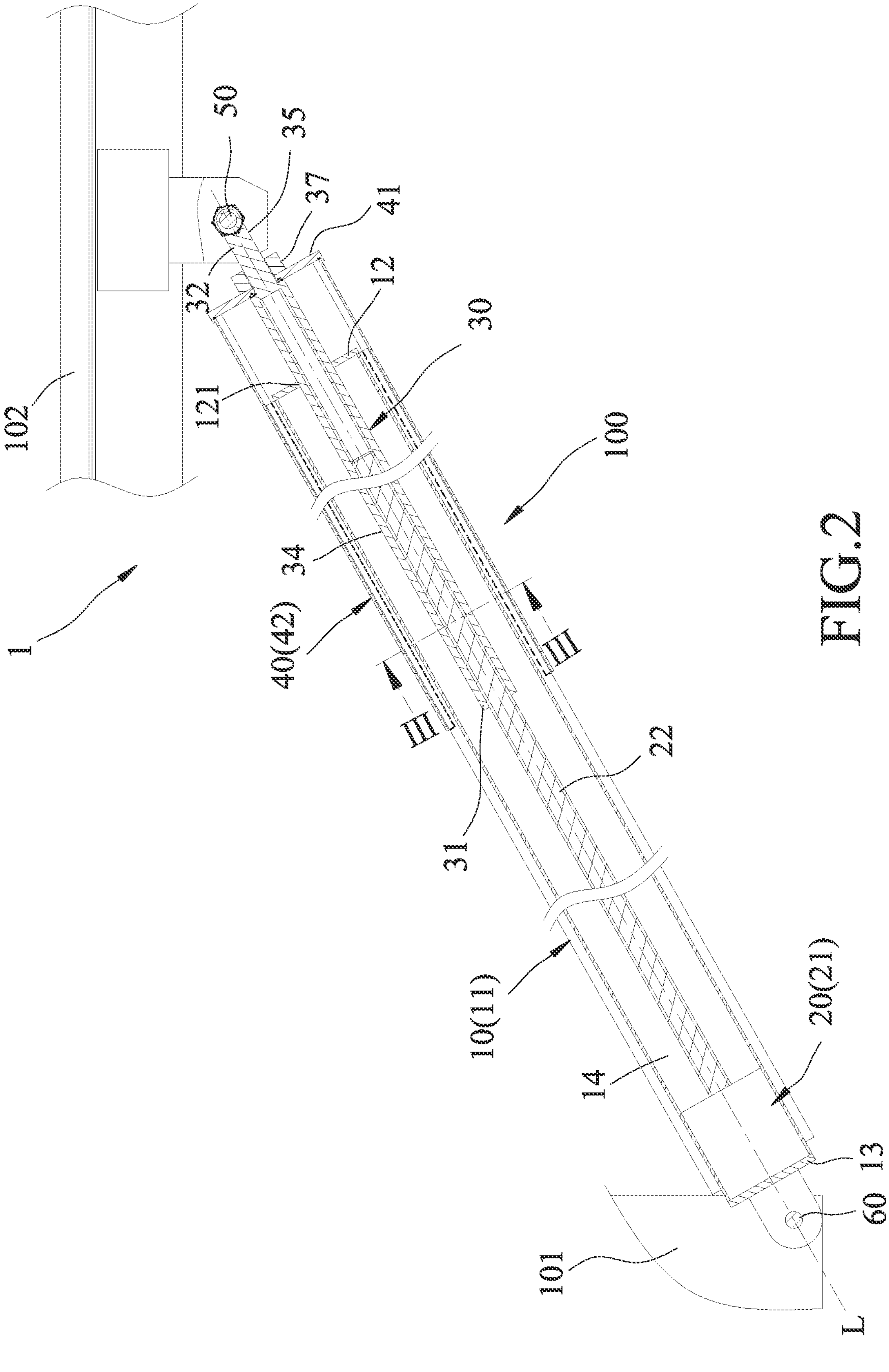
FIG. 2 is a schematic sectional view illustrating the embodiment in a retracted position.
Figure 3:
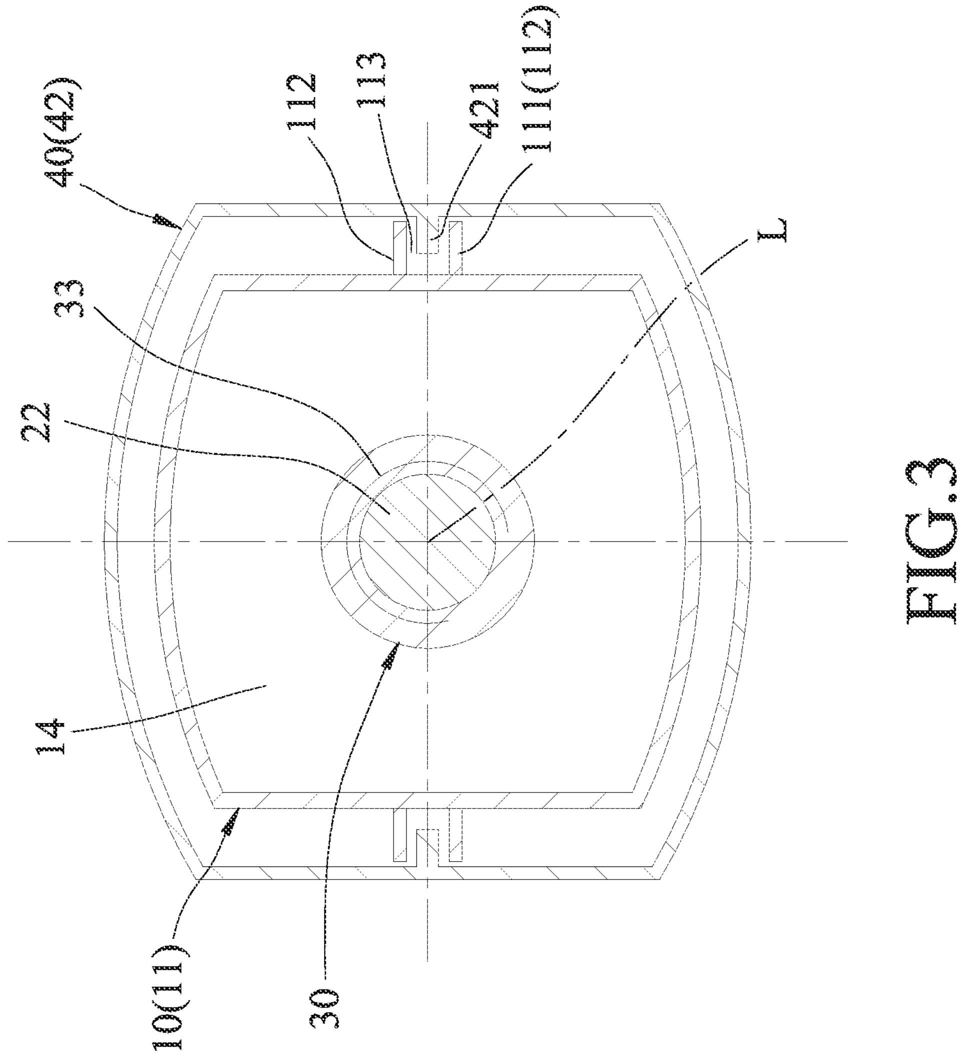
FIG. 3 is a sectional view taken from line III-III of FIG. 2.
Figure 4:
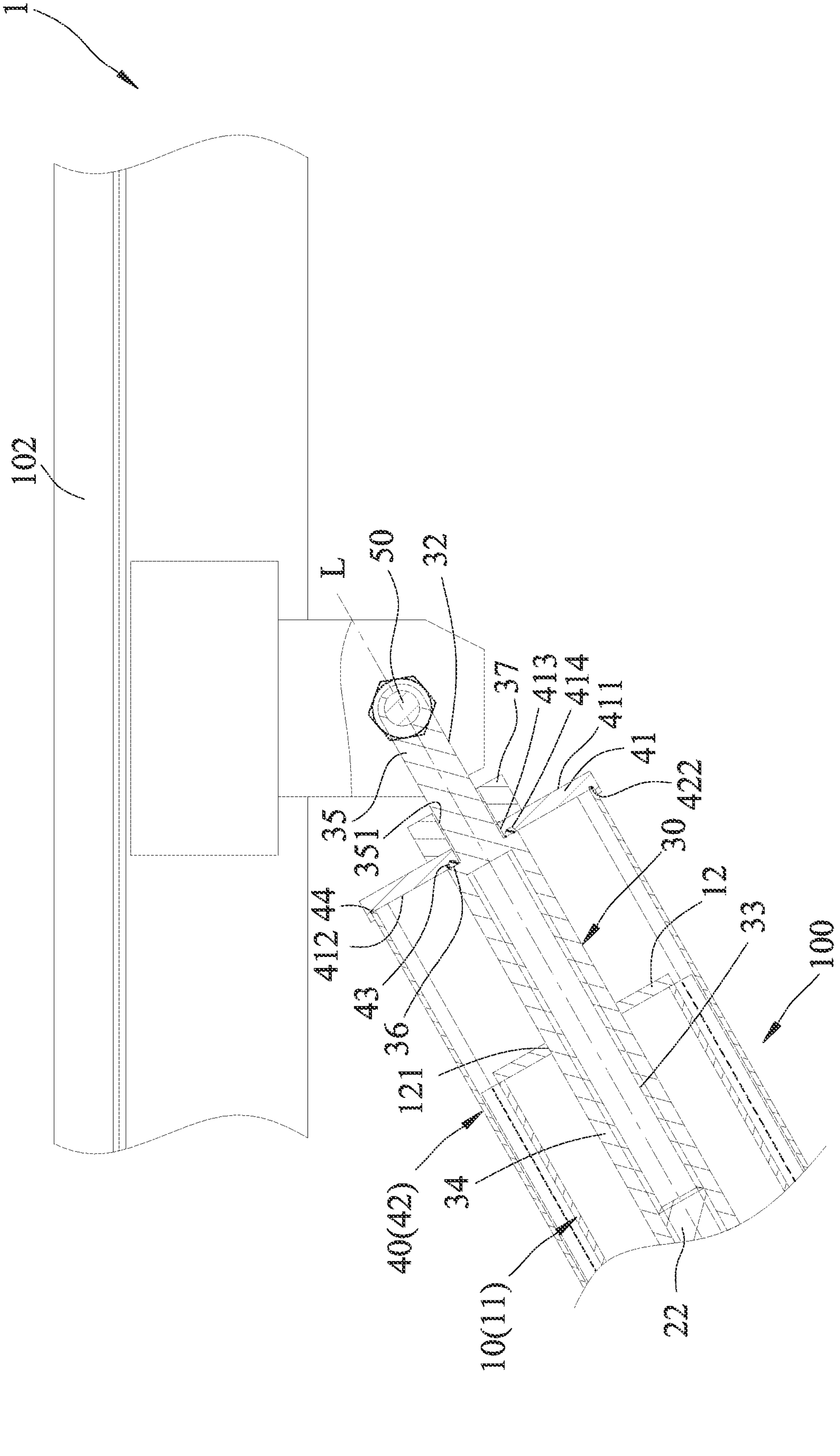
FIG. 4 is a fragmentary enlarged view of FIG. 2.

Referring to FIGS. 1 to 4, an embodiment of a waterproof driving shaft 100 according to the disclosure is adapted to be mounted on a fire ventilation apparatus 1. The fire ventilation apparatus 1 has a frame 101 mountable around an exhaust port 201 of a building 2 (In this embodiment, the exhaust port 201 is at a roof of the building 2), and a cover plate 102 pivotally connected with the frame 101 for covering the exhaust port 201.

Figure 5:
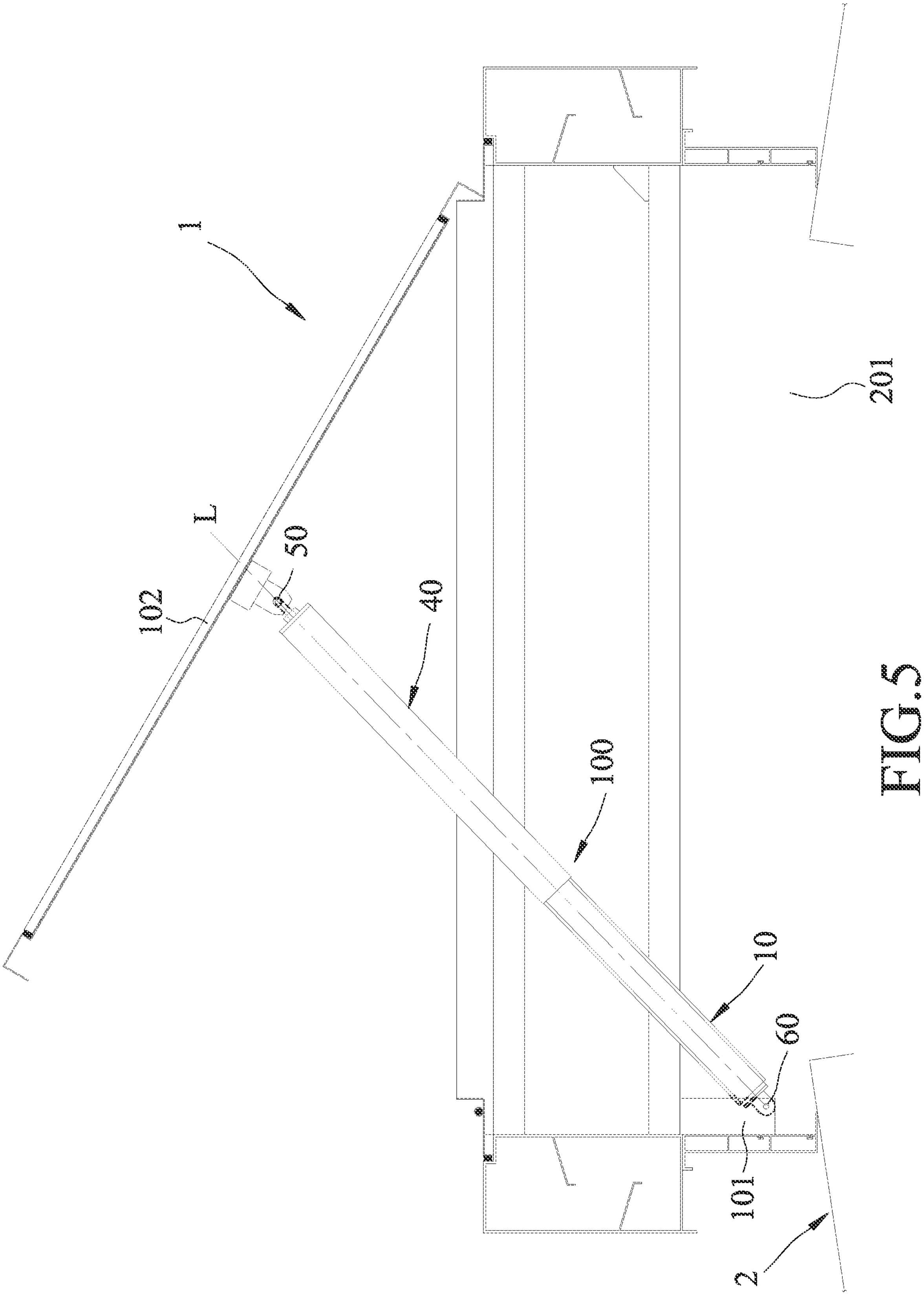
FIG. 5 is a schematic view illustrating the cover plate in a ventilation state relative to the frame.

The waterproof driving shaft 100 is pivotably connected between the frame 101 and the cover plate 102 to turn the cover plate 102 relative to the frame 101 and the exhaust port 201 between a shielding state (as shown in FIG. 1) and a ventilation state (as shown in FIG. 5). The driving shaft 100 includes an inner tubular member 10, an electrical driving unit 20, a moving shaft member 30, a shield unit 40, a first connecting member 50 and a second connecting member 60.

The inner tubular member 10 has a tubular wall 11 which defines an accommodation space 14 therein and which extends along an axis (L), and first and second end walls 12, 13 which are securely mounted on two ends of the tubular wall 11, respectively. The tubular wall 11 has a quadrilateral cross-section (see FIG. 3). A pair of first guiding portions 111 are formed on and extend radially from an outer surface of the tubular wall 11. Each first guiding portion 111 includes a pair of elongated plates 112 which extend along a direction of the axis (L) and are spaced apart from each other to define a guide slot 113 therebetween. The first end wall 12 has a through hole 121 which is formed therethrough and in communication with the accommodation space 14 and at the axis (L).

The electrical driving unit 20 is disposed in the accommodation space 14 of the tubular wall 11. The electrical driving unit 20 includes a driving motor 21 and a threaded bolt 22 coupled with and driven by the driving motor 21 to rotate about the axis (L).

The moving shaft member 30 slidably extends through the through hole 121 and along the axis (L). That is, the moving shaft member 30 has an inner end portion 31 inserted into the accommodation space 14, and an outer end portion 32 extending outwardly of the inner tubular member 10. The inner end portion 31 is actuated by the electrical driving unit 20 to move the outer end portion 32 relative to the inner tubular member 10 along the axis (L). Specifically, the moving shaft member has a threaded hole 33 which extends from the inner end portion 31 toward the outer end portion 32 and along the axis (L) to be threadedly engaged with the threaded bolt 22. Hence, rotation of the threaded bolt 22 actuates the movement of the moving shaft member 30 along the axis (L) relative to the inner tubular member 10. Specifically, the moving shaft member 30 includes a larger-diameter section 34 which has the inner end portion 31 to slidably extend through the through hole 121, and a smaller-diameter section 35 which has the outer end portion 32 and which extends from the larger-diameter section 34 along the axis (L) to form a shoulder 36 therebetween. The smaller-diameter section 35 has an externally threaded portion 351 formed adjacent to the shoulder 36. A screw nut 37 is threadedly engaged with the externally threaded portion 351.

The shield unit 40 is securely connected with the moving shaft member 30. The shield unit 40 includes a surrounding wall 42 which surrounds the tubular wall 11 and the larger-diameter section 34 and which extends along the axis (L) to terminate at a wall end 422 that surrounds the outer end portion 32, and an end cap 41 which is securely connected with the wall end 422 and the moving shaft member 30 and adjacent to the outer end portion 32. The shield unit 40 cooperates with the tubular wall 11 of the inner tubular member 10 to seal the accommodation space 14. The surrounding wall 42 has a quadrilateral cross-section (see FIG. 3). The shield unit 40 further includes a pair of second guiding portions 421 which are formed on and extend radially from an inner surface of the surrounding wall 42 and which are respectively and slidably engaged with the first guiding portions 111 to be slidable relative to the first guiding portions 111 along the axis (L). Each second guiding portion 421 is in the form of a guide key which is elongated in the direction of the axis and slidably engaged in the guide slot 113.

The end cap 41 has an inner cap surface 412 which is attached to the wall end 422, an outer cap surface 411 which is opposite to the inner cap surface 412 along the axis (L), a penetrating hole 413 which extends therethrough along the axis (L) for passing of the moving shaft member 30, and a recess 414 which is recessed from the inner cap surface 412 and in communication with the penetrating hole 413. The shield unit 40 further includes a first O-ring 43 which is disposed in the recess 414 to sealingly engage the end cap 41 and the moving shaft member 30. By the threaded engagement of the screw nut 37 with the externally threaded portion 351, the screw nut 37 abuts against the outer cap surface 411 so as to bring the first O-ring 43 to be between the end cap 41 and the moving shaft member 30 and form a water-tight engagement. The shield unit 40 further includes a second O-ring 44 which is sealingly engaged with the inner cap surface 412 of the end cap 41 and the wall end 422 of the surrounding wall 42.

The first connecting member 50 is disposed on the outer end portion 32 of the moving shaft member 30 to be connected with the cover plate 102 of the fire ventilation apparatus 1 so as to pivotally interconnect the moving shaft member 30 and the cover plate 102.

The second connecting member 60 is disposed on the second end wall 13 of the inner tubular member 10 to be connected with the frame 101 of the fire ventilation apparatus 1 so as to pivotally interconnect the inner tubular member 10 and the frame 101. At least one of the first and second connecting members 50, 60 is made of an alloy material with a low melting point. When the temperature in the building reaches the melting point to cause melting, the first connecting member 50 or the second connecting member 60 may be separated from the cover plate 102 or the frame 101.

Referring again to FIGS. 1 to 4, when the cover plate 102 is in a shielding state relative to the frame 101, the driving shaft 100 is in a retracted position to have a smaller length along the axis (L). That is, the end cap 41 is proximate to the first end wall 12. With the shield unit 40 securely connected with the moving shaft member 30 and covering the inner tubular member 10, and with the first O-ring 43 forming a water-tight engagement between the end cap 41 and the shoulder 36 and the second O-ring 44 forming a water-tight engagement between the surrounding wall 42 and the end cap 41, moisture and humidity may be prevented from entering the inner tubular member 10 and the driving unit 20 within the inner tubular member 10 is protected from moisture.

Figure 6:
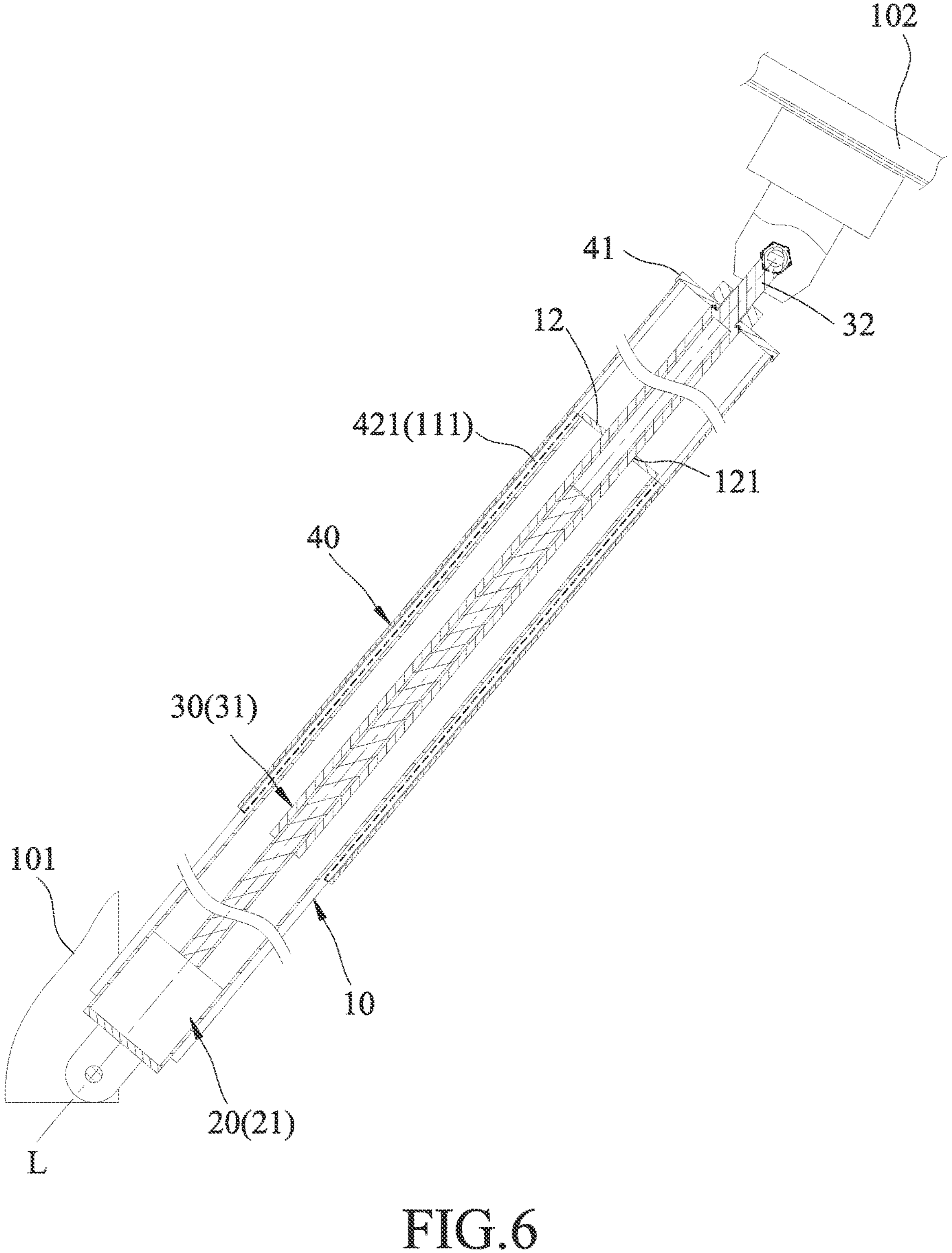
FIG. 6 is a schematic sectional view illustrating the embodiment in an extended position.

Referring to FIGS. 5 and 6, when the motor 21 is actuated to move the inner end portion 31 of the moving shaft member 30 so as to extend the outer end portion 32 relative to the inner tubular member 10, the shield unit 40 is moved with the moving shaft member 30 along the axis (L) so as to bring the end cap 41 away from the first end wall 12. With the sliding engagement of the first and second guiding portions 111, 421, the shield unit 40 is slidable smoothly and steadily relative to the inner tubular member 10.

Referring to FIG. 5, when the moving shaft member 30 extends outwardly relative to the inner tubular member 10, the cover plate 102 is in a ventilating state relative to the frame 101. In this state, even when rain water enters the frame 101, it is prevented from entering the inner tubular member 10 with the shield unit 40 so as to prolong the service life of the driving unit 20.

As illustrated, the waterproof driving shaft 100 has a simple construction and the service life thereof is prolonged.

It is noted that the waterproof driving shaft 100 is mountable on a ventilation apparatus for any other object, such as a door, a window, a vehicle, etc.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A waterproof driving shaft comprising:

an inner tubular member having a tubular wall which defines an accommodation space therein and extends along an axis, a through hole which is formed at an end thereof and in communication with said accommodation space, and at least one first guiding portion which is formed on and extends radially from said tubular wall;

an electrical driving unit disposed in said accommodation space of said tubular wall;

a moving shaft member slidably extending through said through hole and along the axis, said moving shaft member having an inner end portion inserted into said accommodation space, and an outer end portion extending outwardly of said inner tubular member, said inner end portion being actuated by said electrical driving unit to move said outer end portion relative to said inner tubular member along the axis; and a shield unit securely connected with said moving shaft member, said shield unit including a surrounding wall which surrounds said tubular wall and extends along the axis to terminate at a wall end that surrounds said outer end portion, and an end cap which is securely connected with said wall end and said moving shaft member and adjacent to said outer end portion, said end cap having an inner cap surface attached to said wall end, an outer cap surface disposed opposite to said inner cap surface along the axis, a penetrating hole extending therethrough along the axis for passing of said moving shaft member, and a recess that is recessed from said inner cap surface and in communication with said penetrating hole, said shield unit cooperating with said tubular wall to seal said accommodation space, said shield unit further including (a) at least one second guiding portion formed on and extending radially from said surrounding wall and being slidably engaged with said first guiding portion to be slidable relative to said first guiding portion along the axis, and (b) a first O-ring disposed in said recess to sealingly engage said end cap and said moving shaft member.

2. The waterproof driving shaft as claimed in claim 1, wherein said first guiding portion of said inner tubular member includes a pair of elongated plates which extend along a direction of the axis and are spaced apart from each other to define a guide slot therebetween, said second guiding portion of said shield unit is in form of a guide key which is slidably engaged in said guide slot.

3. The waterproof driving shaft as claimed in claim 1, wherein said electrical driving unit includes a driving motor and a threaded bolt coupled with and driven by said driving motor to rotate about the axis, said moving shaft member having a threaded hole which extends from said inner end portion toward said outer end portion and along the axis to be threadedly engaged with said threaded bolt.

4. The waterproof driving shaft as claimed in claim 1, wherein said moving shaft member includes a larger-diameter section which is surrounded by said surrounding wall of said shield unit, a smaller-diameter section which extends from said larger-diameter section along the axis to form a shoulder between said larger-diameter section and said smaller-diameter section, and which has an externally threaded portion formed adjacent to said shoulder, and a screw nut which is threadedly engaged with said externally threaded portion to abut against said outer cap surface so as to bring said first O-ring to be between said end cap and said moving shaft member to form a water-tight engagement.

5. The waterproof driving shaft as claimed in claim 4, wherein said shield unit further includes a second O-ring which is sealingly engaged with said inner cap surface of said end cap and said wall end of said surrounding wall.

6. The waterproof driving shaft as claimed in claim 1, further comprising a first connecting member disposed on said outer end portion of said moving shaft member, and a second connecting member disposed on said inner tubular member and distal from said through hole, at least one of said first and second connecting members being made of an alloy material with a low melting point.

7. A ventilation apparatus mountable on an object with an exhaust port, comprising:

a frame mountable around the exhaust port of the building;

a cover plate pivotally connected with said frame for covering the exhaust port; and a waterproof driving shaft including an inner tubular member having a tubular wall which defines an accommodation space therein and extends along an axis, a through hole which is formed at an end thereof and in communication with said accommodation space, and at least one first guiding portion which is formed on and extends radially from said tubular wall, an electrical driving unit disposed in said accommodation space of said tubular wall, a moving shaft member slidably extending through said through hole and extending along the axis, said moving shaft member having an inner end portion inserted into said accommodation space, and an outer end portion extending outwardly of said inner tubular member, said inner end portion being actuated by said electrical driving unit to move said outer end portion relative to said inner tubular member along the axis, and a shield unit securely connected with said moving shaft member, said shield unit including a surrounding wall which surrounds said tubular wall and extends along the axis to terminate at a wall end that surrounds said outer end portion, and an end cap which is securely connected with said wall end and said moving shaft member and adjacent to said outer end portion, said end cap having an inner cap surface attached to said wall end, an outer cap surface disposed opposite to said inner cap surface along the axis, a penetrating hole extending therethrough along the axis for passing of said moving shaft member, and a recess that is recessed from said inner cap surface and in communication with said penetrating hole, said shield unit cooperating with said tubular wall to seal said accommodation space, said shield unit further including (a) at least one second guiding portion formed on and extending radially from said surrounding wall and being slidably engaged with said first guiding portion to be slidable relative to said first guiding portion along the axis, and (b) an O-ring disposed in said recess to sealingly engage said end cap and said moving shaft member.

* * * * *